(12) United States Patent
Lee (10) Patent No.: US 8,271,030 B2
(45) Date of Patent: Sep. 18, 2012

(54) METHOD OF PROVIDING PREVIEW IMAGE AND MOBILE COMMUNICATION TERMINAL

(75) Inventor: Eun Young Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 963 days.

(21) Appl. No.: 12/188,528

(22) Filed: Aug. 8, 2008

(65) Prior Publication Data

US 2009/0047996 A1 Feb. 19, 2009

(30) Foreign Application Priority Data

Aug. 14, 2007 (KR) ........................ 10-2007-0081892

(51) Int. Cl.
*H04M 1/00* (2006.01)
(52) U.S. Cl. ...................... 455/556.1; 455/517; 455/418; 455/3.05; 345/173; 348/14.02; 700/15; 700/83
(58) Field of Classification Search ................ 455/556.1, 455/517, 414.1, 418, 41.2, 90.2, 3.05; 345/169, 345/173, 1.1; 348/14.02, 559, 14.3; 396/287; 463/43; 700/861, 9, 13, 14, 15, 17, 83; 715/700, 715/771, 864
See application file for complete search history.

(56) References Cited

U.S. PATENT DOCUMENTS

| | | | | |
|---|---|---|---|---|
| 2001/0043194 A1* | 11/2001 | Amron | ........................ | 345/169 |
| 2002/0063799 A1* | 5/2002 | Ortiz et al. | .................... | 348/559 |
| 2007/0036346 A1* | 2/2007 | Kwon | ........................... | 379/413 |
| 2007/0057866 A1* | 3/2007 | Lee et al. | ....................... | 345/1.1 |
| 2007/0075915 A1* | 4/2007 | Cheon et al. | ................... | 345/1.1 |
| 2008/0045142 A1* | 2/2008 | Kim | ................................ | 455/7 |

* cited by examiner

*Primary Examiner* — Shaima Q Aminzay
(74) *Attorney, Agent, or Firm* — Birch, Stewart, Kolasch & Birch, LLP (57) ABSTRACT

A mobile communication terminal including a wireless transceiver configured to perform a video telephony call with at least one other terminal, a display configured to display a first image corresponding to a user of the mobile communication terminal and a second image corresponding to a user of the at least one other terminal during the video telephony call, an input device configured to input a request for an image processing of the first image, and a controller configured to perform a predetermined image processing on the first image according to the input request for the image processing and to control the display to display the image-processed first image as a preview image.

6 Claims, 6 Drawing Sheets

FIG.6

METHOD OF PROVIDING PREVIEW IMAGE AND MOBILE COMMUNICATION TERMINAL

This application claims priority under 35 U.S.C. §119(a) on Patent Application No. 10-2007-0081892 filed in Republic of Korea on Aug. 14, 2007, the entire contents of which are hereby incorporated by reference.

BACKGROUND OF THE INVENTION

1. Field of the Invention

This document relates to a method of providing a preview image when performing video telephony, a method of capturing an image, and a mobile communication terminal.

2. Description of the Related Art

Mobile communication technology has developed from second generation mobile communication technology providing a voice service and a short message service to third generation mobile communication technology providing a high speed data service. The third generation mobile communication technology can provide a new type data service using a band width (1.9 GHz or more) greater than a band width (1.8 GHz or less) of the second generation mobile communication technology and enables consumers to use the data service without restriction of a time and a place. Further, the mobile communication technology has rapidly developed by linking with multimedia technology, voice recognition technology, mobile phone position detecting technology, and Bluetooth technology.

That is, the mobile communication technology has provided a wireless multimedia service that can provide a high speed data service and a video service as well as an existing voice service. Accordingly, a mobile communication terminal uses a high-tech function such as a color display, a mass storage memory, a digital camera, a wireless Internet platform, a multiple chord, a MPEG Audio Layer-3 (MP3) function, and a Video On Demand (VOD) function. Technology development of a mobile communication service and a request of consumers accelerate the mobile communication terminal to provide a multimedia service.

A conventional video telephony method has provided only a function of transmitting a user image photographed with a camera attached to a mobile communication terminal to an another party mobile communication terminal or a function of transmitting a replacement image.

SUMMARY OF THE INVENTION

Accordingly, one object of the present invention is to address the above-noted and other problems of the related art.

To achieve these and other advantages and in accordance with the purpose of the present invention, as embodied and broadly described herein, the present invention provides in one aspect a mobile communication terminal including a wireless transceiver configured to perform a video telephony call with at least one other terminal, a display configured to display a first image corresponding to a user of the mobile communication terminal and a second image corresponding to a user of the at least one other terminal during the video telephony call, an input device configured to input a request for an image processing of the first image, and a controller configured to perform a predetermined image processing on the first image according to the input request for the image processing and to control the display to display the image-processed first image as a preview image.

In another aspect, the present invention provides a method of controlling a mobile communication terminal. The method includes displaying a first image corresponding to a user of the mobile communication terminal and a second image corresponding to a user of at least one other terminal during a video telephony call between the mobile communication terminal and the at least one other terminal, receiving an input request for an image processing of the first image, performing a predetermined image processing on the first image according to the input request for the image processing, and displaying the image-processed first image as a preview image.

In still another aspect, the present invention provides a mobile communication terminal including a display configured to display an image of a user corresponding to another mobile communication terminal that is performing a video telephony call with the mobile communication terminal, an input unit configured to recognize a touching of an area corresponding to the image of the user corresponding to the another mobile communication terminal, and a memory configured to save the touched image of the user corresponding to the another mobile communication terminal as a still image.

In a further aspect, the present invention provides a method of controlling a mobile communication terminal. The method includes displaying an image of a user corresponding to another mobile communication terminal that is performing a video telephony call with the mobile communication terminal, touching an area corresponding to the image or the user corresponding to the another mobile communication terminal, and saving the touched image of the user corresponding to the another mobile communication terminal as a still image.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The details of one or more implementations are set forth in the accompanying drawings and the description below. In the entire description of this document, like reference numerals represent corresponding parts throughout various figures.

S400

S410 of FIG. 4 is a screen illustrating a user image displayed in an another party mobile communication terminal after a filter effect or a balance effect is set.

S420 of FIG. 4 is a screen illustrating a replacement image displayed on an audiovisual communication screen of an another party mobile communication terminal before a camera effect such as a filter effect or a balance effect is set.

DETAILED DESCRIPTION OF THE INVENTION

Hereinafter, implementations will be described in detail with reference to the accompanying drawings.

Figure 1:
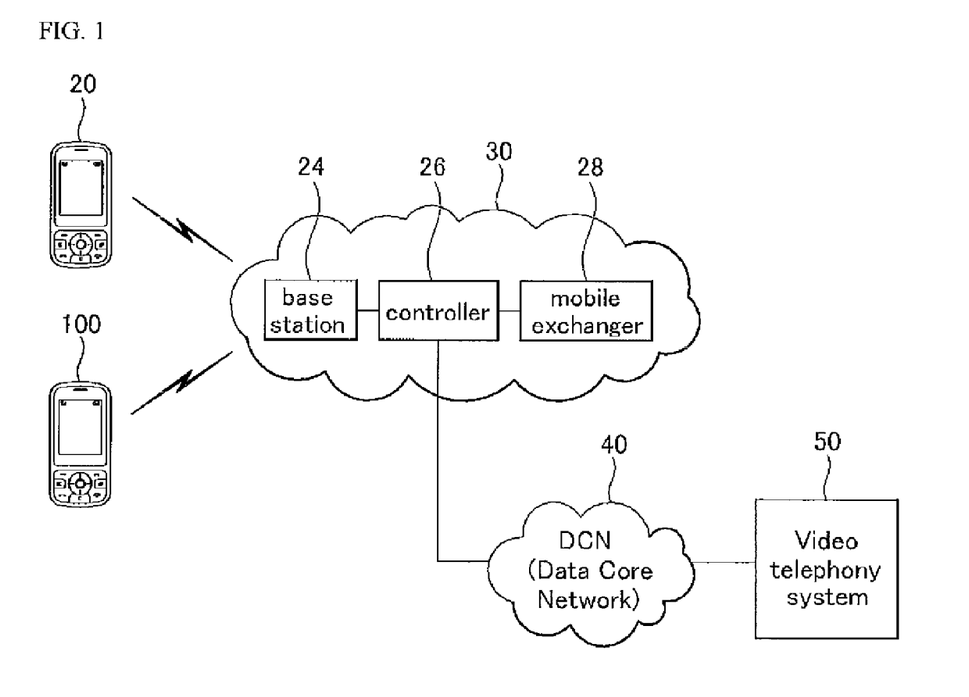
FIG. 1 is a block diagram illustrating an implementation of a network to which this document is applied.

FIG. 1 is a block diagram illustrating an implementation of a network to which this document is applied, Referring to FIG. 1, the network comprises a user mobile communication terminal 100, another party mobile communication terminal 20, a mobile communication network 30, a data core network (DCN) 40, and an video telephony system 50.

The mobile communication network 30 comprises a base station 24, a controller 26, and a mobile exchanger 28.

The base station 24 adjusts a data transmission and reception speed with mobile communication terminals (20, 100), and the controller 26 controls to connect audiovisual communication, a multimedia service, or a VOD service. The mobile exchanger 28 is connected to the controller 26 to perform a call control function, a mobility control function, and various additional service functions. The call control of the mobile exchanger 28 can be performed with a cell unit using an Asynchronous Transfer Mode (ATM) method.

The DCN 40 connected to the controller 26 of the mobile communication network 30 converts a connection signal of the mobile communication terminals (20, 100) to be suitable to video telephony, a multimedia service, and a VOD service.

The video telephony system 50 may comprise an encoding server, a digital server, and a network streaming server in order to process video telephony. The encoding server performs a function of providing data to the mobile communication terminals (20, 100). The digital server stores a motion picture or voice data such as MP3 to digital data and provides the digital data. The network streaming server supplies motion picture data or sound data such as music in a streaming method to the mobile communication network 30. Further, when the mobile communication terminals (20, 100) use a video telephony service, a multimedia service, and a VOD service, the video telephony system 50 also performs a functional of processing a service fee.

In the implementation, when a call for performing video telephony is connected between the user mobile communication terminal 100 and the another party mobile communication terminal 20, the mobile communication network 30 connects a call channel, whereby video telephony is performed while transmitting and receiving image data via the DCN 40 and the video telephony system 50.

Figure 2:
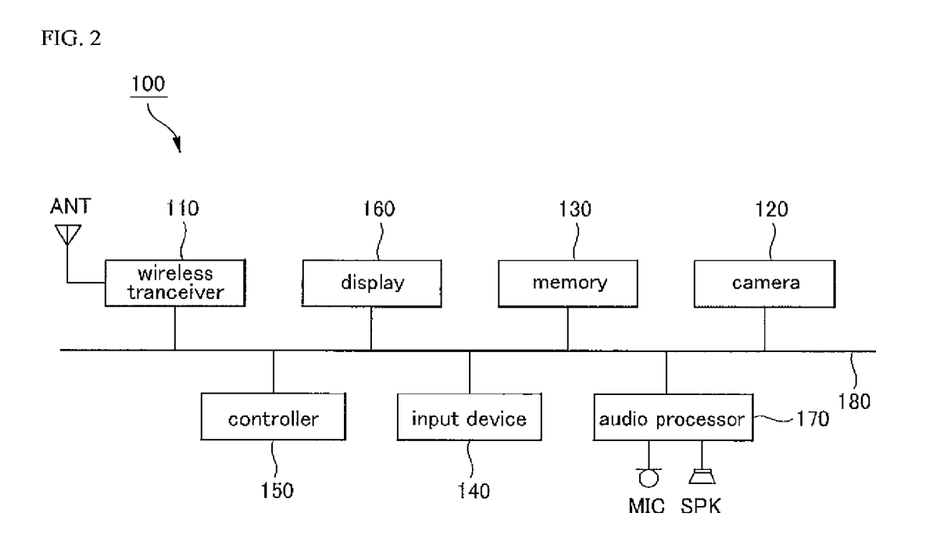
FIG. 2 is a block diagram illustrating a configuration of a mobile communication terminal in an implementation.

FIG. 2 is a block diagram illustrating a configuration of a mobile communication terminal in an implementation.

Referring to FIG. 2, the mobile communication terminal 100 comprises a wireless transceiver 110, a camera unit 120, a memory 130, an input device 140, a controller 150, a display 160, and an audio processor 170. Each of the elements is connected by a bus 180.

The wireless transceiver 10 receives another party's image data by performing communication with an external network through an antenna ANT when performing video technology and transmits user image data to another party mobile communication terminal 20. Image data of another party or the user may be still image data or real time motion picture data.

The camera unit 120 generates image data by photographing a user image of the mobile communication terminal 100 when performing video telephony and transmits the image data to the controller 150.

The memory 130 comprises a program memory and a data memory. In the program memory, a program for controlling general operations of the mobile communication terminal 100 and a software program for controlling an execution of video telephony controls are stored. Further, the memory 130 can store a motion picture or a still image photographed through the camera unit 120, a still image or a motion picture received from another party mobile communication terminal 20 through the wireless transceiver 110, or a motion picture or a still image downloaded by connecting to Internet.

The input device 140 may comprise a key for inputting numeral and character information, a function key for setting or executing various functions, and a direction key for selecting a direction. The input device 140 can use a keypad, a jog dial, a touch pad, a touch screen, and a joy stick. In the implementation, the input device 140 can be used to request an image processing to a user image photographed by the camera unit 120.

The controller 150 controls general operations of the mobile communication terminal 100 and in the implementation, the controller 150 is used as a wide meaning comprising a processor. In the implementation, the controller 150 controls to perform various image processing to the user image and to provide a user image in which an image processing is performed as a preview image.

The display 160 can output various display information and various menu screens output to the mobile communication terminal 100 and use a Liquid Crystal Display (LCD) or an Organic Light Emitting Diode (OLED). Further, the display 160 can use at least two display units.

The audio processor 170 performs a function of reproducing an audio signal decoded and output in the controller 150 through a speaker SPK or processing an audio signal that is input from a microphone MIC and transmitting the audio signal to the controller 150.

Figure 3:
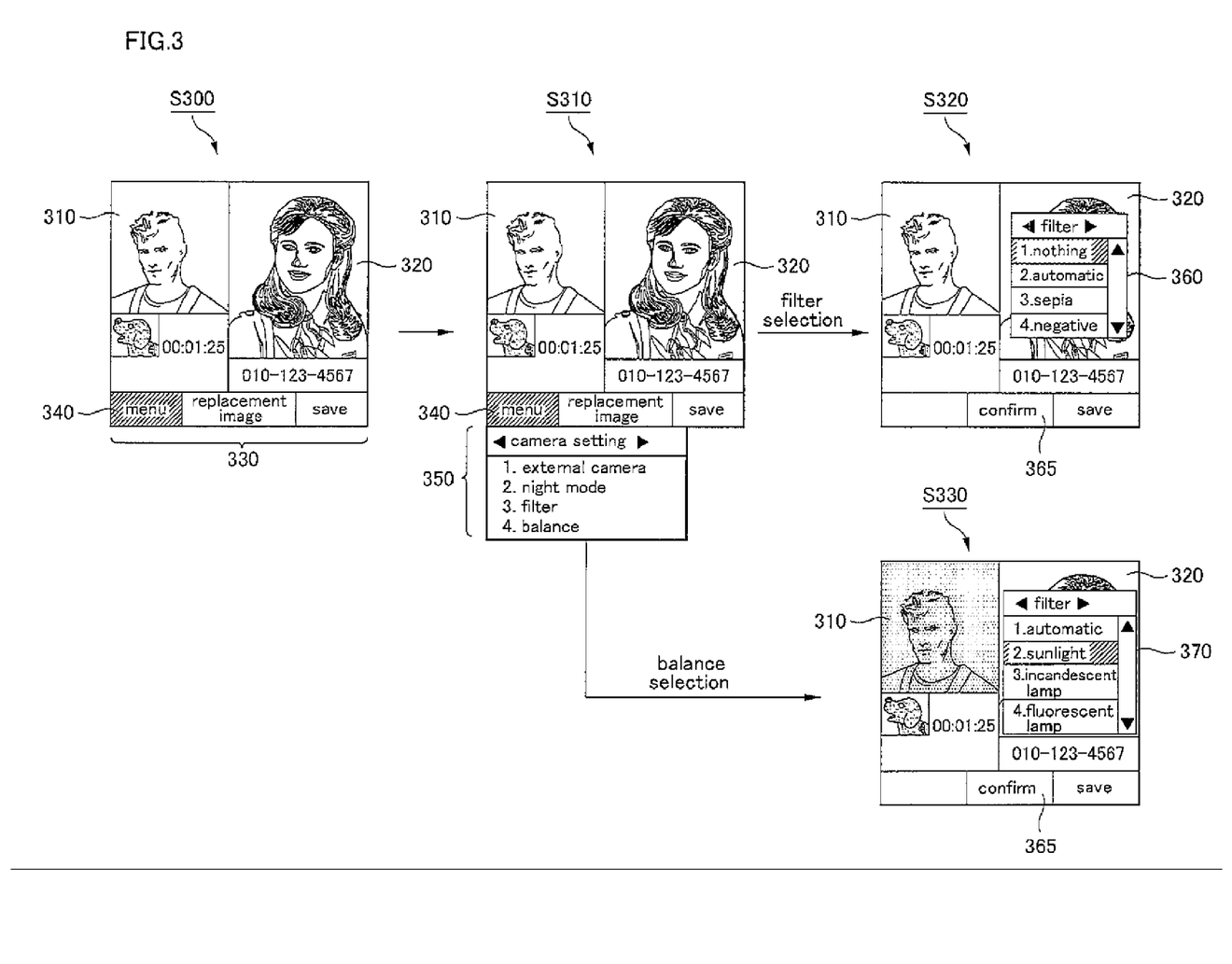
FIG. 3 is a flowchart illustrating a method of performing video telephony in an implementation.

FIG. 3 is a flowchart illustrating a method of performing video telephony in an implementation.

Referring to FIG. 3, when video telephony is started between a user of the mobile communication terminal 100 and another party, an video telephony screen 330 comprising a user image 310 and an another party image 320 is displayed in the display 160 of the mobile communication terminal 100 (S300).

The video telephony screen 330 displayed at step S300 displays a case to which a function of "largely viewing another party" is set. In this case, the another party image 320 is displayed to be greater than the user image 310.

If the user of the mobile communication terminal 100 selects a menu 340 at a lower end of the video telephony screen 330 while performing video telephony with another party, a camera setting menu 350 for setting the camera is displayed (S310). The camera setting menu can be displayed in a pop-up window form.

The camera setting menu 350 comprises a sub-menu such as "1. external camera, 2. night mode, 3. filter, and 4. balance". In the implementation, the user of the mobile communication terminal 100 can apply various image processing effects (hereinafter, referred to as a "camera effect") to the user image 310 using the camera setting menu 350 and check a preview image to which the camera effect is applied.

When the user of the mobile communication terminal 100 selects "3. filter menu" at step S310, a filter menu window 360 is displayed in an On Screen Display (OSD) method in a predetermined area that does not cover the user image 310 (S320). In the implementation, the filter menu window 360 is displayed in an area where the another party image 320 is positioned in order not to cover the user image 310.

The filter menu window 360 may comprises a sub-menu such as "1. nothing, 2. automatic, 3. sepia, and 4. negative", and a cursor is positioned at a currently setting sub-menu (e.g. "1. nothing"). The user of the mobile communication terminal 100 can move a cursor to a sub-menu to select by manipulating a vertical direction key of the input device 140.

When the user of the mobile communication terminal 100 moves a cursor from one sub-menu to another sub-menu, for example from "1. nothing" to "3. sepia", the user image 310 is processed in a state to which a sepia effect is applied and is displayed. That is, whenever the user of the mobile communication terminal 100 changes a sub-menu of a filter menu, a user image to which a filter effect corresponding to the corresponding sub-menu is applied is displayed on a preview screen. The user image displayed on the preview screen may be a real time motion picture or a captured still image.

Further, when the user of the mobile communication terminal 100 selects "4. balance" at step S310, a balance menu window 370 is displayed in an OSD method in a predetermined area that does not cover the user image 310 (S330). In the implementation, the balance menu window 370 is displayed in an area where the another party image 320 is positioned in order not to cover the user image 310.

The balance menu window 370 comprises a sub-menu such as "1. automatic, 2. sunlight, 3. incandescent lamp, and 4. fluorescent lamp", and a cursor is positioned at a currently setting submenu. The user of the mobile communication terminal 100 can move a cursor to another sub-menu to select using a vertical direction key of the input device 140.

When the user of the mobile communication terminal 100 moves the cursor from one sub menu to another sub menu, for example from "1. automatic" to "2. sunlight", the user image 310 is processed to apply a sunlight effect and is displayed at step S330. That is, whenever the user of the mobile communication terminal 100 changes a sub-menu of the balance menu, the user image 310 processed to apply an effect of the corresponding sub-menu is displayed on a preview screen.

When the filter menu window 360 or the balance menu window 370 is displayed, if the user selects a left direction key or a right direction key of the input device 140, another camera setting menu can be displayed. For example, when the filter menu window 360 is displayed, if the user presses once a right direction key of the input device 140, the filter menu window 360 can be changed to the balance menu window 370. Similarly, if the user presses once a left direction key of the input device 140 in the balance menu window 370, the balance menu window 370 can be changed to the filter menu window 360.

In the implementation, when any one of the camera setting menus is selected and a pop-up window such as the filter menu window 360 or the balance menu window 370 is displayed, if the user presses the left direction key or the right direction key of the input device 140, the pop-up window is changed to a pop-up window related to another camera setting menu, thereby improving user convenience, Further, when a cursor is positioned at any one sub-menu and a preview screen is displayed, if the user presses a confirmation button of the input device 140 or selects a confirmation menu 365, which is a soft menu, a specific subs menu of a filter menu or balance menu is finally set by the user.

Until a specific sub-menu of a filter menu or a balance menu is finally set by the user, the user image 210 to which a filter effect or a balance effect is not applied is transmitted to the another party mobile communication terminal 20 through the wireless transceiver 110. In this case, a user image transmitted to another party mobile communication terminal 20 may be a real time motion picture.

Figure 4:
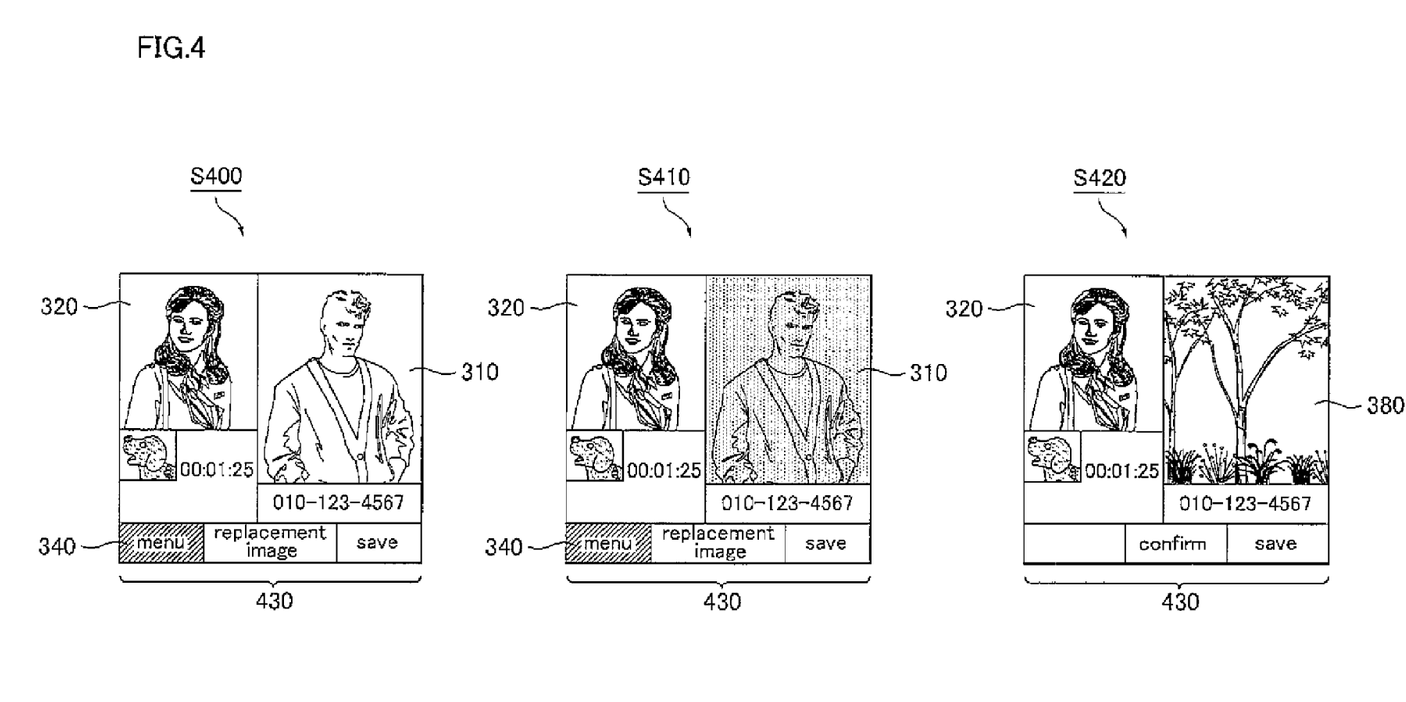
FIG. 4 is a screen illustrating a user image displayed in an another party mobile communication terminal before a filter effect or a balance effect is set.

A screen S400 of FIG. 4 illustrates a user image displayed in another party mobile communication terminal before a filter effect or a balance effect is set.

Referring to the screen S400 of FIG. 4, before a filter effect or a balance effect is finally set by the user, the user image 310 to which the filter effect or the balance effect is not applied is transmitted to the another party mobile communication terminal 20 and is displayed.

Alternatively, when the user presses a confirmation button of the input device 140 or selects the confirmation menu 365, which is a soft menu, thereby finally setting a specific sub-menu of a filter menu or a balance menu, the user image 310 processed to apply the filter effect or the balance effect is displayed on the video telephony screen 430 of the another party mobile communication terminal 20.

A screen S410 of FIG. 4 illustrates a user image displayed in another party mobile communication terminal after a filter effect or a balance effect is set.

Referring to the screen S410 of FIG. 4, after the filter effect or the balance effect is set, the user image 310 processed to apply an effect of the corresponding sub-menu (e.g. sepia, negative, incandescent lamp, and fluorescent lamp) is displayed on the video telephony screen 430 of another party mobile communication terminal 20.

Further, until a specific sub-menu of a filter menu or a balance menu is finally set by the user, the user may preview a user image using the filter menu or the balance menu and transmit a replacement image to another party mobile communication terminal 20.

A screen S420 of FIG. 4 illustrates the replacement image 380 displayed on the video telephony screen 430 of another party mobile communication terminal 20 before a camera effect such as a filter effect or a balance effect is set.

Figure 5:
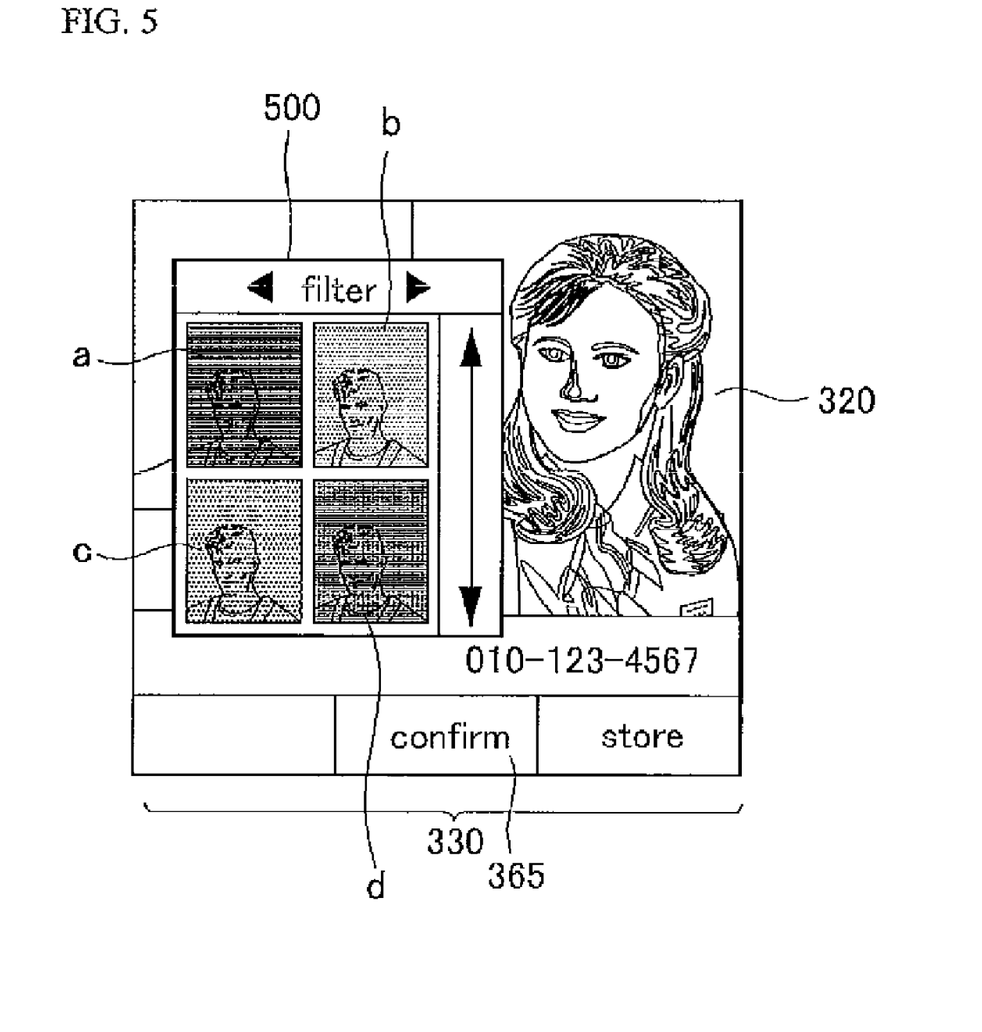
FIG. 5 illustrates a filter menu window in another implementation of this document.

FIG. 5 illustrates a filter menu window in another implementation of this document.

If the user of the mobile communication terminal 100 selects "3. filter" of the camera setting menu 350 at step S310 of FIG. 3, a filter menu window 500 comprising thumbnail images (a to d) processed to apply a different filter effect to the user image 310 can be displayed. In the implementation, unlike the case of FIG. 3, the filter menu window 500 can be displayed in an area that does not cover another party image 320.

When the user selects a thumbnail image to which a specific filter effect (e.g. sepia) is applied among thumbnail images (a to d) processed to apply a different filter effect, a filter effect corresponding to the selected thumbnail image is applied to the user image 310.

In this case, a method of selecting a thumbnail image is performed by touching and selecting the corresponding thumbnail image when the display 160 uses a touch screen. Further, by pressing a confirmation button of the input device 140 or selecting the confirmation menu 365, which is a soft menu after positioning a cursor at a specific thumbnail image, a specific thumbnail image can be selected. When a specific filter effect is set to the user image 310, the user image 310 to which a filter effect is set is transmitted to another party mobile communication terminal 20 and is displayed. In the above-described implementation, the filter menu window 500 is exemplified, however the implementation can be equally applied to a balance menu window.

Figure 6:
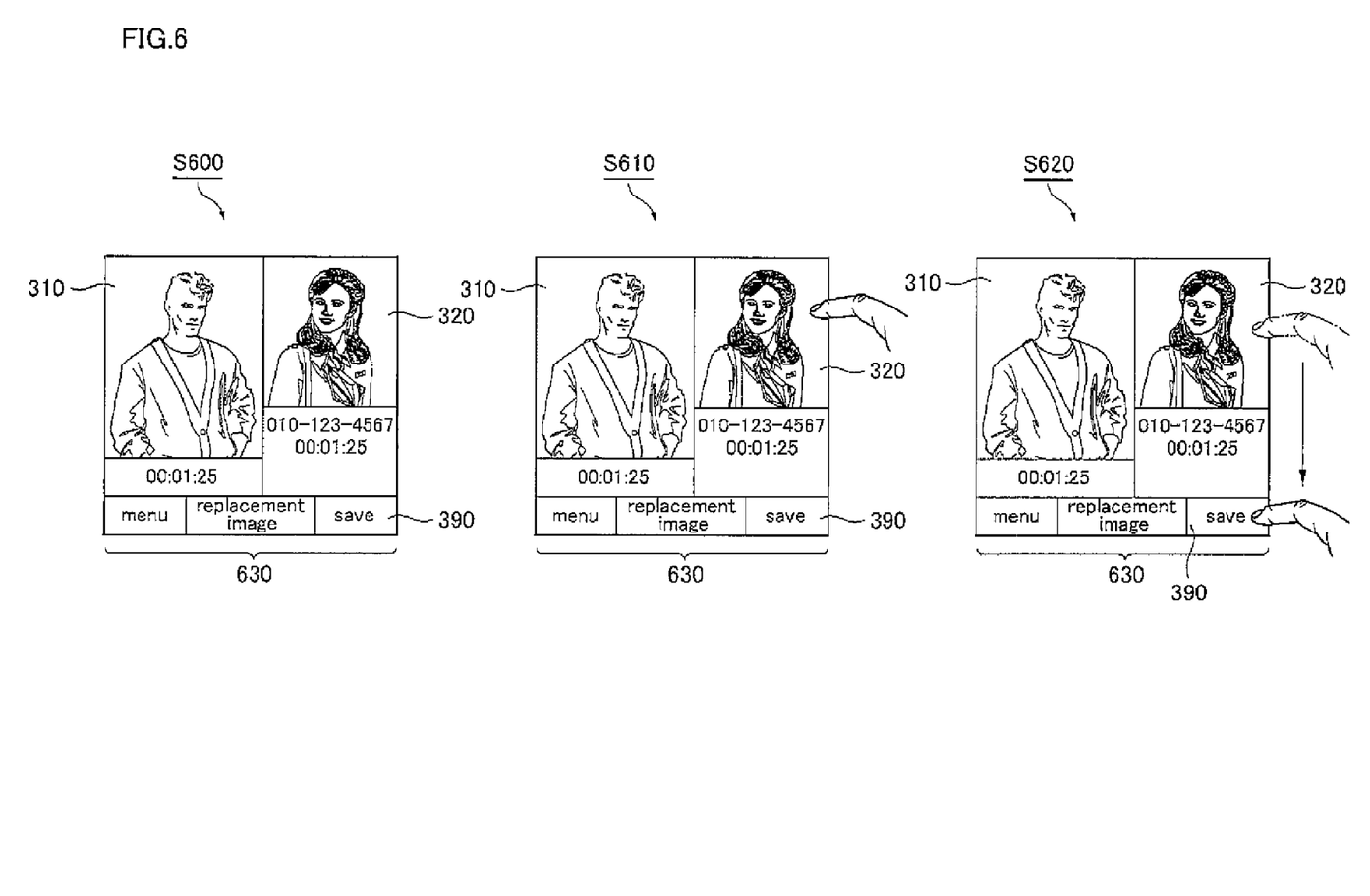
FIG. 6 illustrates a method of capturing another party's motion picture through a touch and drag action while performing video telephony in another implementation.

FIG. 6 illustrates a method of capturing another party's motion picture through a touch and drag action while performing video telephony in another implementation. In the implementation, it is assumed that the display 160 uses a touch screen and image data received from another party is a real time motion picture.

First, referring to a screen S600 of FIG. 6, when video telephony is started between the user of the mobile communication terminal 100 and another party, the user image 310 and the another party image 320 are displayed on an video telephony screen 630 of the mobile communication terminal 100 (S600).

The video telephony screen 630 displayed at step S600 displays a case to which a function of "largely viewing a user image" is set. In this case, the user image 310 is displayed greater than another party image 320.

Another party image 320 may be a real time motion picture. In this case, the user can capture and store a specific screen of motion pictures of another party.

Referring to a screen S610 of FIG. 6, when another party image 320 is a motion picture, the user touches another party image 320 and captures a still image from the motion picture. That is, when the user touches another party image 320, another party image 320 is converted to a still image.

Further, when the user wants to store another party image 320 converted to a still image, the user can store another party's still image in the memory 130 through a touch and drag action.

A screen S620 of FIG. 6 illustrates a touch and drag action for storing the captured still image of another party. That is, after the user touches another party's motion picture with a finger, a stylus pen, etc. and captures another party image 320 of a touch time point into a still image, by moving a touch point to a save menu 390 through a drag action, the captured still image of another party can be stored in the memory 130.

In the above-described implementation, after another party's motion picture is captured into a still image through a touch, a process of storing the captured still image through a drag action is described, however the implementation is not limited thereto.

That is, after a still image is captured by a simple touch action, a function of storing the captured still image in the memory 130 can be performed. For example, when another party's motion picture is touched, another party image 320 is captured into a still image and displayed. In this case, when the save menu 390 is touched, the captured still image of another party may be stored in the memory 130.

In the implementation, by processing a user image using a filter effect or a balance effect of a camera function while performing video telephony, a preview screen can be provided and a user image to which the filter effect or the balance effect is applied can be transmitted to another party.

Other features will be apparent from the description and drawings, and from the claims.

What is claimed is:

1. A mobile communication terminal, comprising:
a camera configured to acquire a first real time motion picture for a video telephony call;
a wireless transceiver configured to receive a second real time motion picture from another mobile communication terminal that is performing the video telephony call with the mobile communication terminal, wherein the second real time motion picture corresponds to the video telephony call;
a touch screen configured to display the first real time motion picture on a first specific area and to display the second real time motion picture on a second specific area different from the first specific area;
a memory; and
a controller configured to receive a touch on the second specific area from the touch screen while the video telephony call is being performed and the second real time motion picture is being displayed on the second specific area, to acquire a first specific image from the second real time motion picture upon receiving the touch on the second specific area, and to store the first specific image in the memory.

2. The mobile communication terminal of claim 1, wherein the touch screen is further configured to recognize a dragging of the touch on the second specific area to a save menu displayed on the touch screen, and
wherein the controller is configured to acquire a second specific image from the second real time motion picture upon the dragging being recognized and to save the second specific image as a still image in the memory.

3. The mobile communication terminal of claim 2, wherein the controller is further configured to acquire a third specific image from the second real time motion picture and to save the third specific image as the still image, when the save menu option displayed on the touch screen is touched.

4. A method of controlling a mobile communication terminal, the method comprising:
acquiring a first real time motion picture for a video telephony call with another mobile communication terminal via a camera of the mobile communication terminal;
receiving a second real time motion picture from said another mobile communication terminal that is performing the video telephony call with the mobile communication terminal, wherein the second real time motion picture corresponds to the video telephony call;
displaying the first real time motion picture on a first specific area of a touch screen of the mobile communication terminal, and displaying the second real time motion picture on a second specific area of the touch screen, the second specific area being different from the first specific area;
receiving a touch on the second specific area while the video telephony call is being performed and the second real time motion picture is being displayed on the second specific area;
acquiring a first specific image from the second real time motion picture upon receiving the touch on the second specific area; and
storing the first specific image in the memory of the mobile communication terminal.

5. The method of claim 4, further comprising:
recognizing a dragging of the touch on the second specific area to a save menu displayed on the touch screen;
acquiring a second specific image from the second real time motion picture upon the dragging being recognized; and
storing the second specific image in the memory.

6. The method of claim 5, further comprising:
receiving a second touch on the save menu option displayed on the touch screen;
acquiring a third specific image from the second real time motion picture upon receiving the second touch; and
storing the third specific image in the memory.

* * * * *